INVENTOR
MYRON N. PLOOSTER
BY Leo A. Plum, Jr.
ATTORNEY

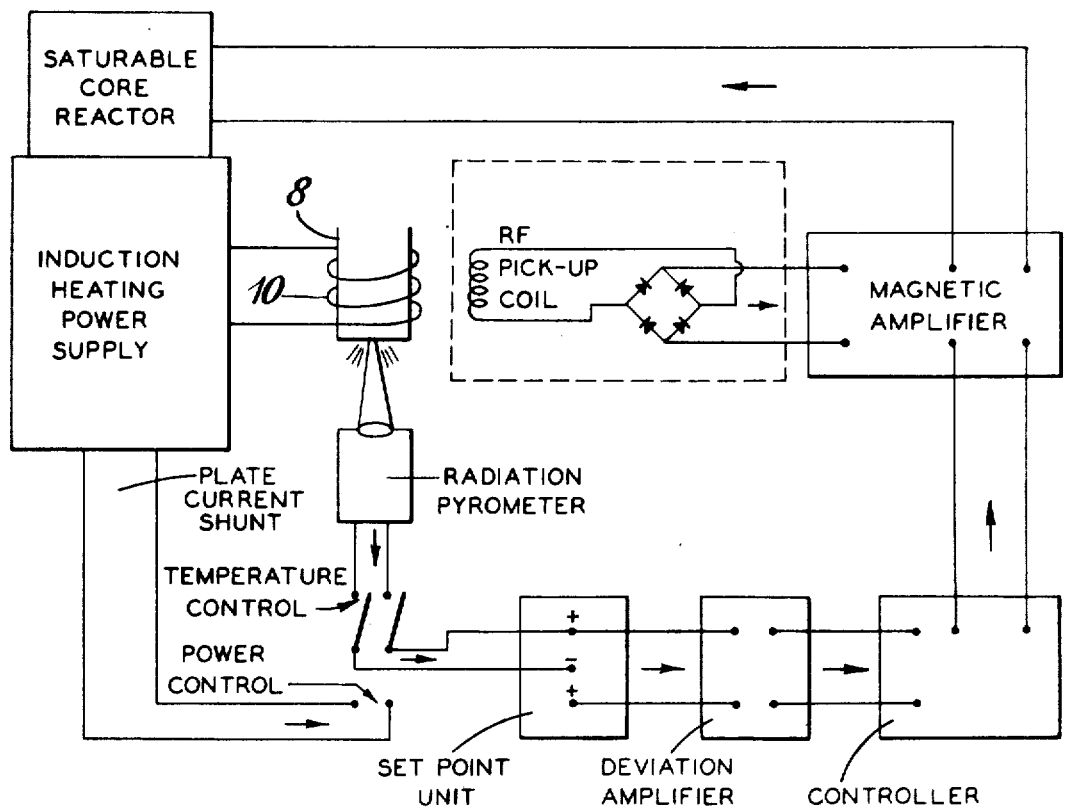

United States Patent Office 3,715,194
Patented Feb. 6, 1973

3,715,194
MELT GROWN ALUMINA CRYSTALS AND
PROCESS THEREFOR
Myron N. Plooster, Boulder, Colo., assignor to Union
Carbide Corporation, New York, N.Y.
Division of application Ser. No. 770,894, Oct. 22, 1968,
which is a continuation of application Ser. No. 481,194,
Aug. 20, 1965, which in turn is a continuation-in-part
of application Ser. No. 300,178, Aug. 6, 1963, all now
abandoned. This application Oct. 29, 1970, Ser. No.
85,261
Int. Cl. B01g 17/18; C01f 7/02
U.S. Cl. 23—301 SP 7 Claims

ABSTRACT OF THE DISCLOSURE

Massive alpha alumina unicrystalline material substantially free of internal strain and crystal misorientation is provided. A process for producing such material by pulling from an alumina melt is also provided.

---

This application is a division of copending application Ser. No. 770,894, filed Oct. 22, 1968, and now abandoned which is in turn a continuation of application Ser. No. 481,194, filed Aug. 20, 1965 and now abandoned, which is in turn a continuation-in-part of application Ser. No. 300,179, filed Aug. 6, 1963 and now abandoned.

This invention relates to a novel alpha alumina unicrystalline material which is substantially free of internal strain and crystal misorientations in the as-grown state and to a process for obtaining such material by pulling from an alumina melt. A particular embodiment of the instant invention relates to a novel unicrystalline ruby material and to a process for obtaining such material by pulling a crystal from a melt of alumina and chromia.

Unicrystalline water-white alpha alumina material and unicrystalline colored alpha alumina material containing such colorants as chromia (red), titania and iron oxide (blue) or oxides such as those of manganese, cobalt, vanadium and nickel (other colors), for example, are known in the prior art. Such materials were usually grown by the Verneuil technique wherein flame-fused powdered material was dropped onto the molten cap of a seed rod. The feed material was then solidified along the bottom of the molten cap so as to increase the length of the seed rod. The seed rod was slowly lowered so as to maintain the molten surface of the cap at a substantially constant distance from the heat source. This prior art technique was especially useful for preparation of unicrystalline product material having an elongated form, such as a rod. Other prior art techniques for growing crystals of alpha alumina and ruby include the fused salt flux, hydrothermal and vapor processes.

The flame-Verneuil technique has been known for about 50 years and has been the technique previously employed to obtain massive non-granular unicrystalline bodies of refractory materials such as alpha alumina (corundum) and ruby; other prior art techniques were not capable of producing large unicrystalline bodies of such material.

Large unicrystalline ruby is used in optical maser or laser applications. Briefly, lasers operate on the principle of light amplification and can create extremely intense concentrations of light. Generally, the ruby laser material is in the form of an elongated rod. The light beam produced by the laser is transmitted through the ruby rod and passes out through an end.

The structure of the ruby laser material must be very nearly perfect since any optical inhomogeneities will cause distortion of the laser beam and thereby destroy the coherence of the beam. Imperfections in the ruby crystal which adversely affect lasing performance include misorientations, chromium concentration gradients, dislocations, inclusions and bubbles.

It is the principal object of the present invention to provide massive non-granular unicrystalline ruby material which is substantially free of dislocations, crystal misorientations, inclusions, bubbles, internal strain, and chromium gradiations.

It is a further object of the present invention to provide massive non-granular unicrystalline alpha alumina material which is substantially free of dislocations, crystal misorientations, inclusions, bubbles, and internal strain.

It is still another object of the present invention to provide a process for the preparation of massive non-granular unicrystalline ruby material which is substantially free of dislocations, crystal misorientations, inclusions, bubbles, internal strain and chromium gradiations.

It is still a further object of the present invention to provide a process for the preparation of massive non-granular unicrystalline alpha alumina material which is substantially free of dislocations, inclusions, bubbles and internal strain.

The term "massive non-granular," as used herein, is intended to designate single crystals as distinguished from a sintered or agglomerated mass of tiny granules. Moreover, this term is further intended to designate crystals which are larger than such tiny particles or granules and which are large enough to be used in optical equipment and, in particular, in laser equipment.

The above referred to objects, other objects, features and advantages of the present invention will become more apparent from the following description, appended claims and drawings in which:

FIG. 2 is a block diagram of the control circuit used in conjunction with the apparatus of FIG. 1 for carrying out the objects of this invention.

Figure 1:
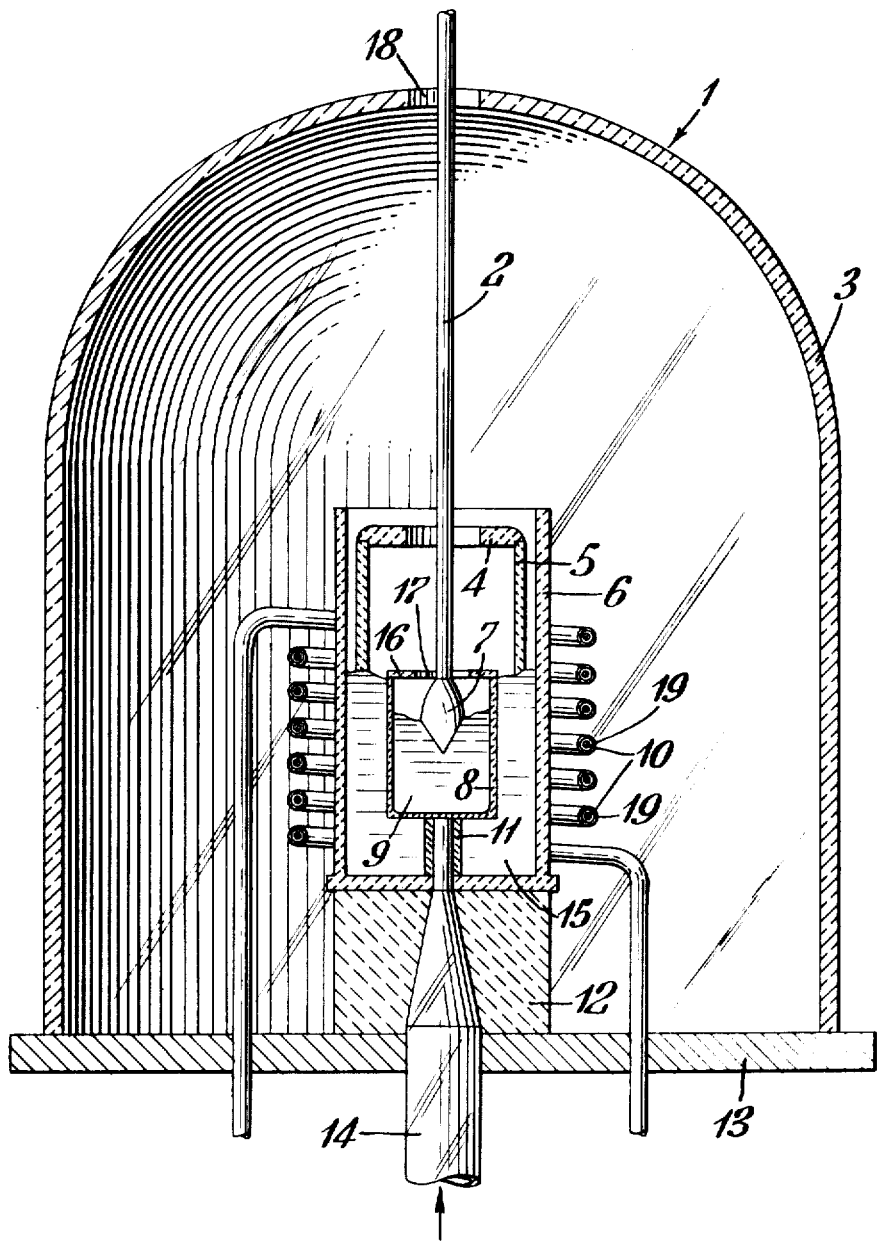
FIG. 1 is an elevational view, partly in section, of the apparatus for carrying out the process and producing the novel unicrystalline materials of ruby and alpha alumina of this invention.

Briefly, and in accordance with one aspect of the present invention, massive unicrystalline ruby material is produced having a minimum lineal cross sectional dimension of ¼ of an inch and a minimum lineal longitudinal dimension of 2 inches, and a dislocation density not exceeding 10,000 C./cm.$^2$. The preferred massive unicrystalline ruby material of this invention is further characterized by misorientations measuring between 5 and 10 seconds of arc, no inclusions, substantially no bubbles or internal strain, and a very low incidence of chromium variation in any direction.

Briefly, and in accordance with another aspect of this invention, ruby is produced by the immersion of a seed material such as sapphire or ruby in a melt of ruby and gradually withdrawn from the melt at a rate not exceeding 0.50 inch per hour. The temperature of the ruby melt is held substantially constant except when regulation of the diameter of the growing crystal is necessary, and the thermal gradients within the melt are controlled such that they are substantially constant and of relatively low value. The atmosphere over the melt is inert to the melt although it may be selectively made either slightly reducing or slightly oxidizing. The melt is maintained contaminant free. Thus, the means by which the melt is maintained molten and its containing vessel are such that they will not be a source of contamination.

Briefly, and in accordance with still another aspect of the present invention, alumina starting material containing any desired additive, such as chromia, is placed in a suitable refractory container or crucible and heated until it is molten. The container or crucible is constructed of refractory material having a melting point higher than the melting point (2040° C.) of the alumina. Additionally, the crucible should be able to withstand high thermal shock created by the molten alumina and be substantially chemically inert to the molten alumina. Tungsten and iridium have been found useful as crucible materials for this service with iridium being preferred. When tungsten is employed as the crucible material, it is preferred that an inert atmosphere be maintained around the crucible to prevent loss of tungsten due to oxidation. In any event, an inert atmosphere is preferred regardless of the crucible material inasmuch as the highest quality crystals are produced with such an atmosphere. Such atmosphere can contain such inert gases as, for example, argon, helium, neon or krypton or nitrogen, which appears to be relatively inert in this application. Heating of the alumina starting material to form the melt is preferably accomplished by inductive electrical heating. Other methods of heating can be employed, however, if they are readily controllable and do not contaminate the growing environment of the crystal. In the inductive heating technique the crucible is employed as a susceptor in an R-F alternating electric field. Currents are induced in the susceptor crucible and thus heat the crucible to a high temperature whereby the contained alumina is heated by conduction. Inductive heating can be employed at atmospheric pressure or at pressures above or below atmospheric. Alternatively, the crucible can be heated by direct application of electrical potential and thus cause resistance currents to pass through the crucible. A flame, such as an oxygen-hydrogen combustion flame, can also be directed at the crucible. Also an electrical arc can be struck to the crucible and the crucible heated by resistance current. Still another technique is the use of an arc-heated gas stream, such as that obtained by a non-transferred arc torch described in U.S. 2,858,411 to heat the crucible. In all these heating techniques the alumina starting material is heated by conduction from the hot crucible. It is of extreme importance in all these heating techniques to guard against contaminating the crystal growing environment and means must be provided as well to allow for the introduction and maintenance of the desired atmosphere above the melt. Once the alumina charge becomes molten, convection currents within the melt tend to stir the melt and even out the melt composition. A unicrystalline seed having desired composition and desired crystal orientation is then placed in contact with the surface of the melt. Preferably, the seed has the same composition as that of the desired unicrystalline product. A small portion of the seed will melt and a temperature gradient will be established between the solid portion of the seed and the melt. The seed is then slowly withdrawn from the melt while material from the melt solidifies at the interface between the solid seed material and the melt. The temperature gradient in the solid phase immediately adjacent to this interface is maintained at a value which enables desired growth conditions to be obtained (gradient of about 15–20° C. in a length of about 2 cm.). As the seed is withdrawn, an elongated crystalline mass forms and grows between the seed and the melt. In this melt-grown process, the temperature gradient in the solid phase immediately adjacent to the growth interface is estimated to be about 100° C. less than the temperature gradient over the solid phase immediately adjacent (about 2 centimeters) to the growth interface of the prior art flame-Verneuil process. These temperature gradient values were determined indirectly by temperature measurements in the zone surrounding the seed. This lower temperature gradient greatly reduces the thermal stresses in the solidified crystal product which lead to internal strains and crystal misorientations.

Referring now to FIG. 1, there is illustrated a crystal growth chamber 1. Ruby or sapphire melt 9 is contained in a crucible 8 which is preferably fabricated from iridium. A washer 16, preferably iridium, having a central aperture 17 rests on top the crucible 8 and acts as a radiation shield to reduce heat loss from the melt 9. The crucible 8 is bounded on its sides and bottom with insulation 15. The insulation is preferably thoria (ThO$_2$) and serves to: reduce the power required to sustain the melt 9; reduce thermal gradients along the crucible; and to dampen temperature fluctuations arising from line voltage fluctuations, convective cooling effects from the atmosphere, as well as other disturbances. Hollow tubing 11 forms an aperture through which the temperature of the bottom of the crucible 8 can be determined by, for example, a radiation pyrometer focused on the center of the bottom of the crucible.

A ceramic washer 4, fabricated from alumina for example, is supported by tubing 5 preferably of thoria (ThO$_2$). The washer 4 serves as a secondary radiation shield and to restrict the convective currents of the atmosphere against entering the top of the crucible and reaching the growing crystal 7. Thus, it serves to reduce the vertical temperature gradients in the vicinity of the growing crystal and to augment the effects of the washer 16.

Sleeve 6, formed of silicon dioxide, for example, serves to contain the insulation 15 and serves as a part of the insulating assembly surrounding the crucible 8. The tubing 5 which serves to support the washer 4 also functions as a part of the insulating system.

The crucible 8 and its surrounding insulating assembly rests on a ceramic pedestal 12 composed of, for example, zirconium oxide (ZrO$_2$). The entire assembly is enclosed in a bell jar 3 sealed to a base plate 13. The base plate 13 is composed of any suitable material such as for example silicone-bonded fiber glass. The desired gas atmosphere for the inside of the crucible 8 is introduced into sight tube 14 which communicates with tubing 11. The gas exits through the hole 18 in the bell jar 3 through which the seed rod 2 is inserted.

The induction coil 10 which serves to sustain the temperature of the melt 9 is preferably formed of from 7 to 9 turns of water-cooled copper tubing. The coil is positioned symmetrically with respect to the crucible to give uniform heating. Electric fields sufficient to cause sparking in argon appear across the work coil in induction heating devices such as described here due to the inductive reactance of the coil at radio frequencies and the high currents passing through the coil. Thus, to achieve satisfactory operation in monatomic atmospheres it has been found necessary to insulate the coil from the monatomic atmosphere. One means of accomplishing this is to thread the work coil 10 and its electrical leads through glass tubing 19 and to circulate distilled water through such tubing. Alternatively a double walled water jacket may be interposed between the coil and the atmosphere.

FIG. 2 illustrates the power supply and control system which is preferably used for the growth of alpha alumina and ruby crystals. The power supply is a 35 kw. induction heater, operable at a nominal frequency of 450 kilocycles with a saturable core reactor to control the power output. The output power can thus be continuously varied from about 10 to 100 percent of the rated power. The crucible 8 serves as the load for the power supply and is loosely coupled to the work coil 10; that is, the crucible's physical dimensions are small compared to the dimension of the coil, and as a result the crucible 8 intercepts only a small fraction of the magnetic field lines generated by the high-frequency current flowing in the coil 10. Induction heating under these conditions requires a large number of ampere turns in the work coil.

Control of the output power supply is preferably accomplished by a three mode proportioning controller, fed by a set point unit and deviation amplifier as illustrated. Either of two methods of control is preferred. In the first, a radiation pyrometer is focused on a spot on the bottom of the crucible 8 containing the molten sapphire or ruby, and its output signal fed to the control system. The second method utilizes a current shunt placed in the ground side of the oscillator plate supply of the induction heating power supply, and the signal generated across this shunt used for control purposes. Since the power output is roughly proportional to the square of the plate current, the second method yields a constant power control as opposed to a constant-temperature control initially described.

The control signal in either the constant power or temperature control is fed to a set point unit, a highly stable D.C. signal generator with a range from 0 to 20 millivolts. The set point unit develops a voltage of opposite polarity to the control signal. The difference between the two signals is fed to a deviation amplifier, which amplifies the difference to provide a strong enough signal to activate the controller. The controller than regulates the output of the power supply to maintain a null signal at its input terminals. The controller has variable proportional band, reset, and rate controls and can thus be adjusted for a variety of response speeds. When using power control, the system preferably has a response time of about a second. (The response time is the time required to correct for a deviation from a null input condition.) When temperature control is used, a response time of the order of 10 to 20 seconds is preferable.

The controller output (0–5 ma. D.C.) is fed to a magnetic amplifier which steps up the output to a current level sufficient to drive the saturable reactors on the power supply, thus completing the control loop.

An auxiliary feedback loop is preferably used to minimize short term fluctuations in output due to line voltage variations. This system is particularly valuable when temperature control is used in order that a fluctuation in power will not effect a temperature change in the crucible and melt before corrective action is undertaken. The auxiliary feedback loop utilizes a pick-up coil placed near one of the output leads from the induction heater to give a signal proportional to the output current of the power supply. The signal is rectified and fed to an auxiliary winding on the magnetic amplifier illustrated with its polarity such that it tends to counteract any change in the output from the power supply.

With the above described control system, the temperature of the melt can be maintained constant within a third of a degree at an operating temperature of about 2100° C.

The mechanism for pulling the growing crystal from the melt is well known in the art. The mechanism allows for the simultaneous pulling and rotation of the growing crystal. For operation with monatomic gases as the atmosphere for crystal growth, it has been found necessary to use a long seed rod 2 which extends outside the bell jar 3 as illustrated in FIG. 1 in order to avoid electrical breakdown of the gas occasioned by the crystal pulling mechanism being at ground potential.

It has been found necessary to follow a very close regimen to grow the superior quality crystals of this invention.

In initiating crystal growth, as well as throughout the crystal growing process, it is very important to guard against contamination of the system. A purge of the atmosphere within the growth regime of all spurious materials is therefore necessary. Thus, high quality crystals were repeatedly grown when the crucible 8 was charged with high quality ruby or sapphire and the growth apparatus completely assembled a day prior to growth in order to allow a purge of air and moisture from the growth environment by a purging gas such as argon. After the purge, the power supply is activated and gradually increased to the power setting required to melt the charge of saphire or ruby.

After the charge is completely molten, the seed rod 2 is slowly lowered into the melt and driven downwards for a short time to insure that a clean, freshly melted surface is established for the beginning of growth. The seed rod is usually sapphire because of its availability, but a ruby seed rod would of course suffice. The melt temperature is also adjusted during this period to reduce the diameter of any solid material which has formed on the seed rod tip to about the diameter of the seed rod itself. This is necessitated by the fact that the sapphire seed rod is a very efficient "light pipe" and acts as a substantial heat sink, removing sufficient thermal energy to freeze a considerable volume of alumina from a completely molten charge.

As soon as the system has come to equilibrium at the desired temperature, pulling is begun. Pulling rates exceeding ⅜ inch per hour are generally deleterious to crystal quality. However, the maximum pulling rate can be determined by the onset of the formation of bubbles, voids, or inclusions in the crystals, for it has been found that crystal deterioration from other factors sets in at growth rates above the limitation imposed by bubble formation.

In general, it is necessary to monitor the crucible temperature or power supply output throughout the growing process to obtain crystals of the desired diameter. At the beginning of the process, unless the initial melt temperature is precisely right, the temperature of the melt must be gradually lowered to bring the crystal diameter to the desired size in a reasonable length of time. It is very important that temperature changes especially in the downward direction, be brought about smoothly and gradually to avoid periods of rapid growth and resultant layers of bubbles and chromium concentration variation in the crystal.

As the crystal grows in diameter and length, and especially when it begins to emerge above the washer 16 on the crucible 8, thermal losses from the melt become more pronounced. It is, therefore, necessary to increase the power to the coil 10 in order to prevent the gradual lowering of the temperature of the melt 9.

As has been previously indicated, the growth condition which led to the elimination of bubbles in the growing crystal also produced a crystal markedly superior to any known heretofore in other respects. However, many facets are involved in the elimination of bubbles and other crystalline defects.

The process variable which most significantly affected crystal quality insofar as inclusion of bubbles is concerned is the pulling rate. It has been found that crystals without visible defects are repeatedly produced at a maximum pulling rate of 0.25 to 0.50 inch per minute. The crystals were viewed through a polished flat under transverse illumination with 15 power microscope.

As another important process variable, it has been found that in the growth of alumina based crystals by the present process, the crystallographic (misorientations, dislocations, etc.) quality is orientation dependent. Using seed crystals having imperfections, it has been virtually impossible to achieve a high quality crystal when growing along the c-axis (a 0° crystal). This is because any imperfections in the seed will be propagated along the c-axis throughout the length of the crystal. In order to achieve a high quality crystal of reasonable length, it has been found that growth should be along an orientation substantially different from the c-axis. A 60° orientation, for example, has been found to be quite suitable. Under such an orientation, any imperfections will be propagated to the sides of the crystal during initial growth, leaving the balance of the crystal of high quality.

Another important process parameter is the control of thermal gradients. Of utmost importance is the control of thermal gradients caused primarily by radiation losses from the melt, the crystal and crucible. One means of reducing the radiation losses is through the use of the washer 4. Without the washer, the bubble contents of as grown crystals were at best between 100 and 1000. With the addition of the washer 4, radial thermal gradients, those gradients perpendicular to the vertical axis of the crucible, were reduced between 30 and 40° C. with a simultaneous reduction of power requirement of about 15%. It is felt that a lower radial thermal gradient will produce less thermal strain at the surface of the growing crystal, with a consequent reduction in the occurrence of defects which serve as nucleation centers for bubble formation. In addition, it is felt that a lower temperature gradient results in a lower degree of super saturation of dissolved gases at the growth interface thus reducing the opportunity for the formation of bubbles in the as grown crystal. The washer or lid 4 also improves the thermal stability of the system by: (a) providing a greater degree of thermal insulation, which will dampen temperature fluctuations; and (b) restricting convection of relatively cool gas from the surrounding atmosphere past the top of the crucible and the growing crystal.

It is of considerable importance to avoid temperature fluctuations especially in the downward direction. When the temperature of the melt drops abruptly as little as one or two degrees centigrade, a heavy layer of bubbles is produced. The imperfection, can, however, be eliminated by remelting and reforming the crystal in the affected zone.

The composition of the atmosphere within the crystal growing environment has a profound effect on crystal quality in several respects including the uniformity of the chromium concentration in the crystal, and the distribution coefficient or the ratio of the average concentration of chromium ions in the crystal to that in the melt. In laser crystals, this is of particular significance since the refractive index in ruby is directly proportional to the chromium concentration; the lower the variation in chromium concentration, the lower the variation in refractive index.

It is well known that ruby material useful in laser applications generally contains about 0.01 to about 0.2 weight percent chromia. An examination of the chromia-alumina phase diagram indicates to one skilled in the art that the segregation coefficient of chromia between the liquid and solid phases is such as to require less chromia in the chromia-alumina melt than would be desired in the solid crystalline product. That is, the phase diagram predicts the chromium content of solid ruby should at all times be greater than that of the melt with which it is in equilibrium regardless of the amount of chromia ($Cr_2O_3$) in the melt. In the case of very dilute ruby, that is with the melt chromia concentration in alumina approaching zero, the prior art would predict that the ratio of the chromium concentration in the solid to that in the liquid will be equal to the ratio of the slopes of the liquidus and solidus curves of the alumina-chromia phase diagram as the chromia concentration approaches zero. This value is about 2.1. This is the value of the distribution coefficient which would be expected to be exhibited by a growing crystal if growth took place at such a slow rate that the crystal is in thermodynamic equilibrium with the melt at all times during growth.

It is known that a distribution coefficient different from unity implies a rejection of one component of the system at the growth interface, with the result that a concentration gradient is built up in the liquid. The concentration gradient can only be dissipated by diffusion processes. It is known that the actual distribution coefficient will asymptotically approach the equilibrium value, 2.1, at low growth rates and high diffusion rates and will approach unity at high growth rates and low diffusion rates. In real crystal growth systems, the observed value will fall between these two extremes. It has been found, however, that even when ruby is pulled at slow rates, for example 0.25 inch/hour, the diffusion process was sufficiently slow to reduce the observed distribution coefficient well below the predicted equilibrium value of 2.1.

It has also been found that the distribution coefficient varies over a wide range and in almost all cases was less than unity. This variation is dependent on the atmosphere within the crystal growing environment. The distribution coefficient observed for growth in pure argon was in the range of about 0.7 to about 0.8. In an oxidizing atmosphere, the distribution coefficient increases as the amount of oxidant in the atmosphere increases. For example, with 20 percent oxygen ($O_2$) in an 80 percent argon atmosphere the observed distribution coefficient was about 1.6. When growing ruby in air, this value, 1.6, was not reached in an air-argon atmosphere until the air occupied essentially 100 percent of the atmosphere. The presence of hydrogen in the argon atmosphere also had a startling effect. As the hydrogen approached 20 percent of the argon-hydrogen atmosphere, the observed distribution coefficient was about 0.1. The segregation coefficient in nitrogen-containing atmospheres was about the same as in argon containing atmospheres.

While the reasons for this pronounced atmospheric effect on distribution coefficients is not certain, the following is a hypothesis. In strongly reducing atmospheres, practically all the chromium in the melt is reduced from the trivalent state to some (unknown) lower state, and the melt must be heavily doped to attain a given crystal composition. In argon atmospheres, the extent of reducing appears to be much lower, but is still sufficient to suppress the distribution coefficient slightly below unity. Only when oxygen is added to the atmosphere is this reduction prevented and the behavior predictable from the binary phase diagram.

In addition to the above observations, there are a number of seemingly minor process variables that have drastic effects upon the formation of bubbles in sapphire and ruby crystals and thus make it difficult to construct any simple hypothesis as to their origin. A number of these include the presence or absence of a ceramic radiation shield (indicated by reference numeral 4 of FIG. 1) above the crucible, and the cleanliness of the system including the thermal insulation used. The most important process variable of all, however, is the fact that even when all other conditions have been optimised, there is a limiting growth rate above which bubbles are always found.

One variable which has little effect on internal crystal quality is the rate at which the seed rod and crystal are rotated. Very high quality crystals were grown at rotation rates of about 60 r.p.m. However, on some occasions it was found that crystals tended to grow off their axis of rotation. This effect can be minimized by slowing the rate of rotation to about 15 r.p.m.

Using the apparatus and procedure described in the foregoing, high quality ruby crystals, free of any visible inclusions or defects were grown consistently. Table I below indicates the quality of the ruby crystals grown in argon, and argon-nitrogen atmospheres. As has previously been indicated, the bubble content of the ruby crystals correlates with other indicia of quality; as the bubble content diminishes the overall quality of the crystal increases. The bubble content was ascertained by polishing a flat along one side of the ruby crystal and examining the interior through this polished surface with a 15 power microscope under strong transverse illumination. All the ruby crystals grown were of at least one quarter of an inch in diameter. The orientation of the crystals refers to the angle between the growth or longitudinal axis of the crystal and the crystallographic c-axis. The ceramic lid refers to washer 4 of FIG. 1 and unless otherwise indicated the lid was in place.

observed in every case. In crystals "b" and "c," the concentration was highest near the seed end and decreased smoothly down the crystal. The rate of change was about 3.7 percent per centimeter for crystal "b." In crystal "e," a 90° crystal, the gradient was 1.8 percent per centimeter in the opposite direction. Crystal "a" was cut into sections

TABLE I

| Atmosphere | Orientation (deg.) | Growth rate (in./hr.) | Rotation rate (revolutions per min.) | Crystal length (in.) | Remarks |
|---|---|---|---|---|---|
| Pure argon | 60 | 0.35 | 60 | 1½ | Light microbubbles present, about 100 to 1,000 in entire crystal; no ceramic lid. |
| | 60 | >0.5 | 60 | 1½ | Light microbubbles present, about 100 to 1,000 in entire crystal. |
| | 60 | 0.25 | 60 | 1¼ | Very high quality crystal with no visible defects. |
| | 60 | 0.25 | 60 | 2¼ | Do. |
| | 60 | 0.25 | 120 | 1¼ | Very high quality crystal with less than 10 bubbles throughout the entire crystal. |
| | 0 | 0.25 | 60 | 2 | Very few bubbles present, about 5 to 50 in entire crystal. |
| | 0 | 0.25 | 60 | 2½ | Very high quality crystal with no visible defects. |
| | 60 | 0.35 | 15 | 4 | Do. |
| | 90 | 0.25 | 60 | 2¼ | Do. |
| 5 percent nitrogen in argon | 60 | 0.35 | 15 | | Light concentration of microbubbles present, about 100 to 1,000 in entire crystal. |
| 15 percent nitrogen in argon | 60 | 0.35 | 15 | | Very high quality crystal with no visible defects. |
| 50 percent nitrogen in argon | 60 | 0.35 | 15 | | Very light concentration of microbubbles present about 100 to less than 1,000 in entire crystal. |
| 25 percent nitrogen in argon | 60 | 0.25 | 15 | | Very high quality crystal with no visible defects. |
| | 60 | 0.35–0.5 | 15 | | The section of the crystal grown at 0.35 inches/hour was a very high quality with essentially no bubbles, the section grown at 0.5 inches/hour had a light concentration of microbubbles present, about 100 to 1,000 in entire crystal. |

EXAMPLE I

A minimum chromium concentration gradient is required in the preparation of ruby crystals of high optical quality, since the refractive index of ruby varies with chromium concentration. The uniformity of distribution of the chromium dopant in six ruby crystals grown by the process of this invention was tested. These crystals were fabricated into windows with flat faces both parallel (longitudinal) and perpendicular (transverse) to the crystal axes to allow examination for both axial and radial chromium concentrations. The uniformity of distribution of the chromium dopant in the ruby crystals was determined by transversing a sharply collimated light beam at 5470 A. across the "window" samples. 5470 A. is the peak of one of the absorption bands of ruby. The dimensions of the light beam where it passed through windows was about 0.1 mm. in order that chromium fluctuations over small distances could be ascertained. Table II below lists the more important growth conditions with the crystal quality for these crystals. The listed parameters have the same meaning as in Table I.

and samples from its top, middle and bottom regions submitted for chromium analysis by chemical methods. The chromium concentration in this crystal varied over a 2 inch length from 0.042 percent at the top to 0.037 percent at the bottom agreeing quite well with the data on crystals "b" and "c."

EXAMPLE II

Measurement of dislocation densities in crystals is a well known measure of crystalline perfection. Dislocation counts for several ruby and sapphire crystals grown in accordance with the teaching of this invention were made. The dislocation counts were made by etching a polished surface normal to the crystallographic c-axis of each of the crystals tested. The etchant material was hot $H_3PO_4$. The dislocation density was determined by counting the etch pits on photomicrographs of different areas of the surface. The same etching technique was applied to ruby crystals grown by the flame fusion or Verneuil process. The flame fusion crystals yielded dislocation densities of several $\times 10^6$ per square centimeter. The average disloca-

TABLE II

| Crystal | Atmosphere | Orientation (deg.) | Growth rate | Rotation rate | Remarks |
|---|---|---|---|---|---|
| a | Pure argon | 60 | 0.25 | 6 | Poor grade crystal, large bubbles present (bubbles due to equipment failure) Crystal fabricated into a transverse window. |
| b | do | 60 | 0.25 | 120 | Very high quality crystal, about 5 to less than 50 bubbles in entire crystal. Crystal fabricated into longitudinal and transverse window. |
| c | do | 60 | 0.25 | 60 | Do. |
| d | do | 0 | 0.25 | 60 | High quality crystal, about 5 to 50 bubbles in entire crystal. Crystal fabricated into longitudinal and transverse windows. |
| e | do | 90 | 0.25 | 60 | Very high quality crystal, no visible defects. Crystal fabricated into longitudinal and transverse windows. |
| f | 50 percent nitrogen in argon | 60 | 0.35 | 15 | Crystal had light concentrations of microbubbles present, about 100 to 1,000 in entire crystal. Crystal fabricated into transverse window. |

The radial variation in chromium concentration for crystals "a," "c" and "e" is quite small with a maximum variation over 12 mm. of about 0.001 percent chromia ($Cr_2O_3$). These three crystals have less radial chromium variation than any known crystals. Relatively larger variations were observed in crystals "b," "d" and "f" which differed in growth parameters from the other crystals by having a fast rotation rate, 120 r.p.m.; a zero degree orientation; and a nitrogen in argon atmosphere respectively.

The same spectrophotometric technique was used for the determination of longitudinal chromium concentration variations in crystals "b," "c," "d" and "e." A gradual variation in chromium concentration along the crystal was tion counts for the crystals pulled in accordance with this invention were of the order $10^3$ to $10^4$ per square centimeter with some areas giving etch pit counts of the order of 100/cm.$^2$.

EXAMPLE III

A 90° ruby crystal grown in accordance with the principles of this invention was examined for misorientation by the well known double crystal X-ray technique. This crystal displayed random mosaic-type misorientations of 5 seconds of arc over millimeter-size areas and 10 seconds of arc over centimeter-size areas. 0° crystals have much higher misorientations. It is tentatively believed that imperfections in the seed crystal, both misorientations and dislocations, propagate parallel to the c-axis of ruby and sapphire crystals pulled from the melt. Observations of dislocation densities in 60° crystals indicate that imperfections are of a relatively high magnitude near the seed end of the crystal and diminish dramatically as the distance from this region increases. Thus, dislocations and misorientations in the seed would grow off to the side of the crystal and soon terminate on its surface leaving the remaining portions of the crystal free from the influence of the seed crystal.

EXAMPLE IV

The most informative technique used for evaluation of the optical homogeneity of laser rods of ruby grown in accordance with this invention is Twyman-Green interferometry. This technique measures directly the variations in the optical path (physical length multiplied by refractive index) through the rod. When the end faces of the laser rod are ground truly parallel, the Twyman-Green interferometer provides an accurate determination of the variation of the refractive index over the cross-section of the rod. Alternating light and dark bands, "interference fringes," will appear where changes in refractive index occur. Adjacent fringes represent variations in the optical path of one-half the wavelength of light used. The total variation across a given rod is then given by:

$$\frac{N\lambda}{2} = (\Delta n)(L)$$

where N is the total number of fringes observed, $\lambda$ the wavelength of the light used, L the length of the rod in centimeters, and $\Delta n$ the variation in refractive index.

All of the 60° rods showed two fringes or less variation. Since these rods were from 2.5 to 6 cm. long, the maximum variation in refractive index was of the order of $2 \times 10^{-5}$ or less. In addition, the fringes present were in a regular pattern. Interferograms of flame fusion crystals show a materially greater number of interference fringes, often in no regular pattern.

Schlieren photographs of the ruby crystals analyzed by the Twyman-Geen interferogram were also taken in order to determine variations in their refractive index. The variation in light intensity in a Schlieren photograph is directly related to the derivative of the refractive index. The Schlieren photographs of the 60° pulled ruby rods showed very low variation in refractive index and thus indicated an extremely high quality crystal. Flame fusion-grown ruby showed considerable variations in properties when analyzed by this technique.

EXAMPLE V

Lasing tests were performed on ten laser rods grown in accordance with this invention. Table III below shows the most important growth parameters of these laser rods. The process parameters have the same meaning indicated previously for the other tables. As indicated in the table, four of the crystals were annealed.

joules were observed. This output pulse coupled with the smaller beam diveregnce of the instant crystals allowed holes to be burned in exposed X-ray film from a distance of up to 5 feet. This was achieved even though the laser output beam was not focused. The threshold energies for lasing were iniformly quite low for the pulled ruby rods, remaining more consistently so than the flame fusion ruby rods. The threshold pumping energies for the rods which were annealed were in all cases lower than those for the corresponding unannealed rods, the average difference being about 20 percent.

In addition, the far field patterns of the output beams from the pulled ruby rods were quite symmetrical and circular in shape even though the beam was not focused.

EXAMPLE VI

About 75 grams of cleaned chunks of alumina crystals were placed in a tungsten crucible having an inside diameter of 1¼ inches, a wall thickness of ¹⁄₁₆-inch and a height of 1½ inches. The crucible was placed within a 14 turn induction heating coil having an I.D. of 1⅞ inches. The crucible stood on a pedestal containing packed thoria powder while the space between the coil and the crucible was also packed with thoria powder. This entire apparatus was enclosed in a glass bell jar having an aperture at its top. An inert argon atomsphere containing about 50 volume percent hydrogen was maintained inside the bell jar. The induction heating coil was energized from a well known R-F induction heating unit and the power was increased until the induced current in the tungsten crucible heated it to a "white heat." Conductive heat from the tungsten crucible then melted the alumina chunks to form a melt. A unicrystalline alpha alumina seed having a size of about 0.10-in. dia. was lowered through the aperture in the bell jar until it contacted the surface of the melt. The seed was then withdrawn from the melt at about ¼-inch per hour for 4½ hours. The power to the induction coil and the pull rate were adjusted from time to time in order to obtain a substantially constant cross-section boule product. A final elongated boule having a diameter of about ½-inch and length of about 2 inches was thus obtained (volume of 0.39 cubic inch). This boule was massive non-granular unicrystalline alpha alumina (corundum) having improved optical characteristics.

EXAMPLE VII

A charge of 99.5 grams of almina crystals and 0.5 gram of chromia (0.5 weight percent $Cr_2O_3$) was placed in a tungsten crucible and melted in a manner similar to that described in Example VI above. A ruby seed crystal having a size of about 0.10 in. dia. was inserted into the melt and then withdrawn at a rate of about ¼-inch per hour. After approximately 4½ hours, a boule ¼-inch in diameter and 1¾ in. long was grown (volume of 0.086 cubic in.). This massive, non-granular unicrystal-

TABLE III

| Crystal | Orientation (deg.) | Growth rate (in./hr.) | Rotation rate (revolutions per min.) | Atmosphere | Remarks |
|---|---|---|---|---|---|
| a | 60 | 0.25 | 60 | Pure argon | Very good crystal, less than 10 bubbles throughout. |
| b | 60 | 0.25 | 60 | do | Do. |
| c | 60 | 0.25 | 60 | do | Very good crystal, no visible defects. |
| d | 60 | 0.35 | 60 | do | Do. |
| e | 60 | 0.35 | 60 | do | Very good crystal, no visible defects; crystal annealed. |
| f | 60 | 0.35 | 60 | do | Do. |
| g | 0 | 0.25 | 60 | do | Very good crystal, about 5 to 50 bubbles in entire crystal; crystal annealed. |
| h | 0 | 0.25 | 60 | do | Very good crystal, no visible defects. |
| i | 90 | 0.25 | 60 | do | Do. |
| j | 90 | 0.25 | 60 | do | Very good crystal, no visible defects; crystal annealed. |

The results of the lasing tests indicate that the above tested crystals performed considerably better than prior art ruby crystals. The beam divergence of a majority of the crystals was about half that of a high quality flame fusion-grown laser rod. Output pulses greater than 3.5 line ruby boule had improved optical characteristics.

EXAMPLE VIII

A charge of alpha alumina (corundum) crystals was placed in an iridium crucible and heated with an oxygen-hydrogen flame. No inert atmosphere was used. An alpha alumina seed crystal was withdrawn from the melt to produce a massive, non-granular unicrystalline alpha alumina boule product having improved optical characteristics.

Massive unicrystalline alpha alumina and chromia alpha alumina materials obtained by techniques similar to those described above were evaluated for optical properties. Examination of the crystals in cross-Polaroid filters indicated no internal strain or misorientation (no subgrain boundaries). Schultz-Wei X-ray photographs show no crystal misorientation. The limit of detection of this technique is approximately 1 min. of arc misorientation. Furthermore, the dislocation density of this material is less than about $10^4$/sq. cm. whereas prior art flame-fusion grown alumina had dislocation densities of greater than about 10/sq. cm. The dislocation density is an indication of internal strain of the crystal and thus the lower the dislocation density, the better the material.

The above discussion is directed primarily at the production of massive unicrystalline alpha alumina products useful in laser equipment. It should be understood that the products of the present invention can also be used in other optical applications as well as for wear-resistant apparatus, such as textile fiber guides, and for gemstones. Such utility is well known in the art for unicrystalline alpha alumina material.

What is claimed is:

1. A process for the production of massive unicrystalline alpha alumina which is substantially free of internal strain and crystal misorientation in the as-grown state which comprises:
    forming a melt of alumina by heating same to a temperature of at least 2040° C.;
    inserting a seed rod of alpha alumina into the melt;
    maintaining an atmosphere over the melt which is substantially chemically inert to the melt;
    withdrawing the seed rod from the melt such that alumina material is solidified and crystallized on the seed rod to form a massive unicrystalline product of increasing length, the withdrawal rate of the seed rod from the melt being sufficiently limited such that bubbles do not form in the massive unicrystalline product;
    and controlling the temperature of the seed rod and massive unicrystalline product such that at least a portion of the radiant energy emitted therefrom is supplied to the atmosphere over the melt.

2. A process for the production of massive unicrystalline ruby which is substantially free of internal strain and crystal misorientation in the as-grown state which comprises:
    forming a melt of alpha alumina and chromia by heating same to a temperature of at least 2040° C.;
    inserting a seed rod into the melt, the seed rod selected from a class of materials consisting of alpha alumina and ruby;
    maintaining an atmosphere over the melt which is substantially chemically inert to the melt;
    withdrawing the seed rod from the melt such that ruby material is solidified and crystallized on the seed rod to form a massive unicrystalline product of increasing length, the withdrawal rate of the seed rod from the melt being sufficiently limited such that bubbles do not form in the massive unicrystalline product;
    and controlling the temperature of the seed rod and massive unicrystalline product such that at least a portion of the radiant energy emitted therefrom is supplied to the atmosphere over the melt.

3. The process claimed in claim 2 wherein the atmosphere is argon and the seed rod is withdrawn at a rate not exceeding about 0.50 inch per hour.

4. The process claimed in claim 3 wherein the temperature of the melt is not varied over two degrees centigrade.

5. The process claimed in claim 2 wherein the distribution coefficient between the melt and the ruby material is increased by adding an oxidizing gas to the atmosphere above the melt.

6. The process claimed in claim 2 wherein the distribution coefficient between the melt and the ruby is lowered by adding a reducing gas to the atmosphere above the melt.

7. A process for the production of massive unicrystalline alpha alumina which is substantially free of internal strain and crystal misorientation in the as-grown state which comprises:
    forming a melt of alumina and chromia by heating same to a temperature of at least 2040° C.;
    inserting a seed rod of alpha alumina into the melt;
    flowing an oxidizing gas over the surface of the melt and then removing said gas from the vicinity of the melt surface;
    withdrawing the seed rod from the melt such that alumina material is solidified and crystallized on the seed rod to form a massive unicrystalline product of increasing length;
    and controlling the temperature of the seed rod and massive unicrystalline product such that at least a portion of the radiant energy emitted therefrom is supplied to the atmosphere over the melt.

References Cited

UNITED STATES PATENTS

| 3,224,844 | 12/1965 | Gerthsen | 23—301 |
| 3,519,394 | 7/1970 | Petit-Le Du et al. | 23—301 |
| 3,527,574 | 9/1970 | La Belle, Jr. | 23—301 |
| 3,591,348 | 7/1971 | La Belle, Jr. | 23—301 |
| 3,595,803 | 7/1971 | Dugger | 23—305 |

FOREIGN PATENTS

| 935,390 | 8/1963 | United Kingdom | 23—305 |
| 15,901 | 7/1968 | Japan | 23—305 |

NORMAN YUDKOFF, Primary Examiner

R. T. FOSTER, Assistant Examiner

U.S. Cl. X.R.

23—305; 106—42; 423—625